United States Patent
Aritake et al.

(10) Patent No.: US 6,723,414 B2
(45) Date of Patent: Apr. 20, 2004

(54) VEHICLE GLASS RUN AND METHOD OF MANUFACTURING THE SAME

(75) Inventors: Masanori Aritake, Nishikasugai (JP); Hitoshi Omori, Nishikasugai (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/932,978

(22) Filed: Aug. 21, 2001

(65) Prior Publication Data

US 2002/0025405 A1 Feb. 28, 2002

(30) Foreign Application Priority Data

Aug. 23, 2000 (JP) ........................... 2000-251946

(51) Int. Cl.[7] ............... B32B 3/04; E06B 7/16; E06B 7/22; B60J 10/02; B60J 1/08
(52) U.S. Cl. ............... 428/122; 49/479.1; 49/490.1; 49/498.1; 296/93; 296/146.2
(58) Field of Search ................. 428/122; 49/479.1, 49/490.1, 498.1; 296/93, 146.2

(56) References Cited

U.S. PATENT DOCUMENTS 4,902,738 A * 2/1990 Mitsuno et al. ............. 524/525
5,424,135 A * 6/1995 Murata et al. ............... 428/517
6,487,820 B1 * 12/2002 Nakajima et al. .......... 49/490.1

FOREIGN PATENT DOCUMENTS

| GB | 2259664 | 3/1993 |
|---|---|---|
| GB | 2326435 | 12/1998 |
| GB | 2329143 | 3/1999 |
| GB | 2334288 | 8/1999 |
| JP | 61149331 | 7/1986 |

* cited by examiner

Primary Examiner—Harold Pyon
Assistant Examiner—Chris Bruenjes
(74) Attorney, Agent, or Firm—Posz & Bethards, PLC

(57) ABSTRACT

A vehicle glass run is formed with a horizontal-side extrusion part, vertical-side extrusion parts, and corner molding parts for connecting the terminal ends of those in an L shape by molding. The horizontal-side extrusion part and the vertical-side extrusion parts are made of a first material of an olefin thermoplastic elastomer. The corner molding parts are made of a second material which is an olefin thermoplastic elastomer and has a viscosity lower than that of the first material. The material swiftly reaches the terminal ends of the extrusion parts, and heat welds them together.

8 Claims, 4 Drawing Sheets

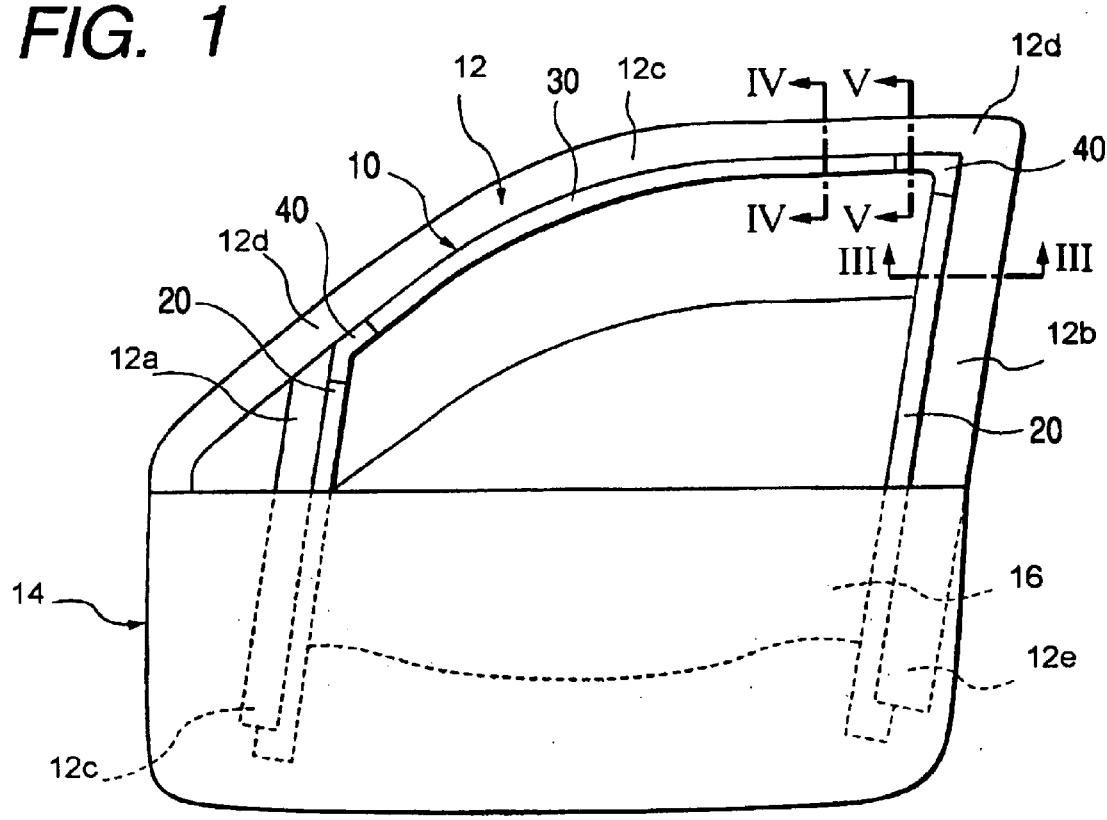
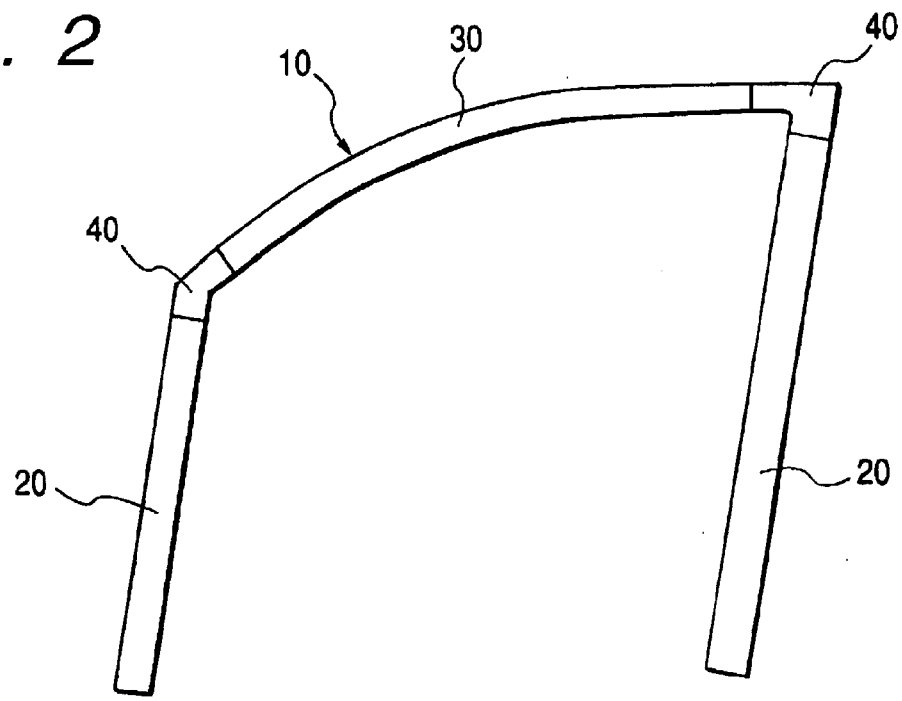

VEHICLE GLASS RUN AND METHOD OF MANUFACTURING THE SAME

BACKGROUND OF THE INVENTION

1. Field of the Invention

The present invention relates to a vehicle glass run, which is mounted on a door frame of a vehicle and a method of manufacturing the same. More particularly, the invention relates to a structure of a corner part and a method of manufacturing the same.

The present application is based on Japanese Patent Application No. 2000-251946, which is incorporated herein by reference.

2. Description of the Related Art

A conventional vehicle glass run mounted on the side door (frame) is disclosed in Unexamined Japanese Patent Publication No. Hei. 10-44786. The vehicle glass run is provided with extrusion parts for the roof and pillars, and the corner molding parts connecting those extrusion parts together. The extrusion parts and the corner molding parts are U-shaped in cross section. A door glass is slidably moved within and along the sliding grooves of the glass run. Sealing lips contact to the surfaces of the door glass, which are sealing between the inside and outside of the vehicle. Further, the sealing lips guide an upward and downward slide movement of the door glass.

The vehicle glass run is manufactured by the following process. Thermoplastic elastomer is extruded and cut to have a predetermined length to form extruded pieces. The extruded pieces are set in a mold. And, thermoplastic elastomer is injected into a cavity. The injected thermoplastic elastomer welds the surfaces of the terminal ends of the extruded pieces by heat and pressure, thereby connecting them. The thermoplastic elastomer is cooled and solidified. As a result, the corner molding parts connecting the terminal ends of the extruded pieces in an L shape are formed. The corner molding parts are shaped resembling the corners of the side door.

In the vehicle glass run, a reliable sliding movement of the door glass is folded with the side ends of the pillar-side extrusion parts. Accordingly, the U-shaped sliding groove must be deep. The merely supports the upper-side end of the door glass put thereinto. Attempt is made to design the roof-side extrusion part with a shallow groove to make the external appearance good. When the vehicle glass run is designed such that the grooves of the pillar-side and roof-side extrusion parts are different in depth, viz., the cross sectional shapes of them are different, and both the extrusion parts are connected by the corner molding parts which are various in cross sectional shape, the size of the pillar-side portion of the corner molding part is larger than the roof-side portion of the corner molding part.

Enlargement of the corner molding part implies that a distance from the gate position for injecting the thermoplastic elastomer to the terminal end of the extrusion part is increased. Accordingly, the thermoplastic elastomer cannot rapidly travel and reach the terminal ends of the extrusion parts, while keeping its high temperature. As a result, the thermoplastic elastomer cannot weld and connect the terminal ends of them by heat and pressure. If the heat welding of them is insufficient, a connecting strength at the connecting part between the extrusion part and the corner molding part decreases. As a result, there is a danger that both the parts are separated from each other with the sliding movement of the door glass.

SUMMARY OF THE INVENTION

Accordingly, an object of the present invention is to provide a vehicle glass run and a method of manufacturing the same in which corner molding parts are connected at high connecting strength to extrusion parts, and those are firmly supported on a frame.

According to one aspect of the invention, there is provided a vehicle glass run which is to be mounted on a frame having a substantially linear frame body and L-shaped frame corner parts, connected to the frame body, and is made of a thermoplastic elastomer and slidably supports a door glass. The vehicle glass run comprises: a horizontal-side extrusion part and vertical-side extrusion parts, which are mounted on the frame body; and corner molding parts, mounted on the frame corner parts, for connecting together the terminal ends of the horizontal-side extrusion part and the vertical-side extrusion parts by injection molding; wherein the horizontal-side extrusion part and the vertical-side extrusion parts are made of a first material of an olefin thermoplastic elastomer, and the corner molding parts are made of a second material which is an olefin thermoplastic elastomer and has a viscosity lower than that of the first material.

In the vehicle glass run thus constructed, the first material of an olefin thermoplastic elastomer is extruded to form the horizontal-side extrusion part and the vertical-side extrusion part. Those parts are both connected together by heat welding using the corner molding parts formed by injecting the second material.

In the injection molding, the second material is injected in a molten state, and reaches the terminal ends of the horizontal-side extrusion part and the vertical-side extrusion parts and melts the surfaces of the terminal ends of them by heat and pressure. Those terminal ends are easily connected together since the olefin thermoplastic elastomer that is the same as the first material is used.

Further, the viscosity of the second material is lower than that of the first material. And its fluidity is large. Therefore, even if a distance from the injection position to the terminal ends of the horizontal-side extrusion part and the vertical-side extrusion parts is long, the material swiftly reaches the terminal ends while keeping its high temperature and molten state. It melts both the terminal ends of them by heat and pressure and firmly heat-welds to them. Therefore, even when the cross sectional shape of the horizontal-side extrusion part is different from that of the vertical-side extrusion part, and the corner molding parts are greatly different in length, the corner molding part reliably heat-welds to both the terminal ends. The resultant product has a high connecting strength.

If the second material of low viscosity is used for the corner molding parts, a hardness of it is slightly increased. However, it little affects the use performance of the vehicle glass run. Since the first material as the normal material is used for the vertical-side extrusion parts and the horizontal-side extrusion part, there is no chance that the use performance of the vehicle glass run is degraded.

In the vehicle glass run, a melt flow rate (referred to as MFR) of the materials are measured by K7210 (corresponding to ISO 11339) testing method prescribed in JIS (Japanese Industrial Standard), and MFR of the first material is 45 to 70 g/10 min. and MFR of the second material is 70 to 100 g/10 min. The reason why MFR of the second material is 70 to 100 g/10 min follows. If it is smaller than 70 g/10 min, its fluidity is small. Before it reaches the terminal ends of the horizontal-side extrusion part and the vertical-side extrusion parts, its temperature drops. And, its heat welding to the terminal ends is insufficient, and the connecting strength is also unsatisfactory. If it exceeds 100 g/10 min, its fluidity is excessively large. Burrs will be formed and the material will leak (sag and run) to the horizontal-side extrusion part and the vertical-side extrusion part. Accordingly, an additional step to remove the burrs is essential to complicate the molding process.

Also in the vehicle glass run, the first material may mainly contain 70 weight parts of ethylene-polypropylene rubber (EPDM) and 30 weight parts of polypropylene (PP). The second material may be prepared by adding a third material whose viscosity is lower than that of PP of the first material, to the same kind of material as of the first material as a main material.

In the vehicle glass run, parts of the horizontal-side extrusion part by which a door glass are supported are smaller than those of the vertical-side extrusion parts, and each the corner molding part includes a variable connecting part whose cross section gradually decreases in area toward the horizontal-side extrusion part, from the vertical-side extrusion part. The vehicle glass run thus constructed is well adaptable for a case where the corner molding part is likely to be long.

According to another aspect of the invention, there is provided a method of manufacturing the above vehicle glass run, comprising: extruding the first material of an olefin thermoplastic elastomer to form an extruded piece for the vertical-side extrusion parts and the horizontal-side extrusion part; setting the extruded piece so as to form a cavity in a mold; and forming the corner molding parts connected to the extruded piece by injecting the second material whose viscosity is lower than that of the first material into the cavity of the mold.

The vehicle glass run of the invention may preferably be manufactured by the manufacturing method mentioned above.

The above and other objects and features of the present invention will be more apparent from the following description taken in conjunction with the accompanying drawings.

BRIEF DESCRIPTION OF THE DRAWINGS

In the accompanying drawings:

FIG. 1 is an external appearance view showing a side door of a vehicle to which a vehicle glass run constructed according to the invention is assembled;

FIG. 2 is an external appearance view showing the vehicle glass run;

DETAILED DESCRIPTION OF THE PREFERRED EMBODIMENTS

Figure 3:
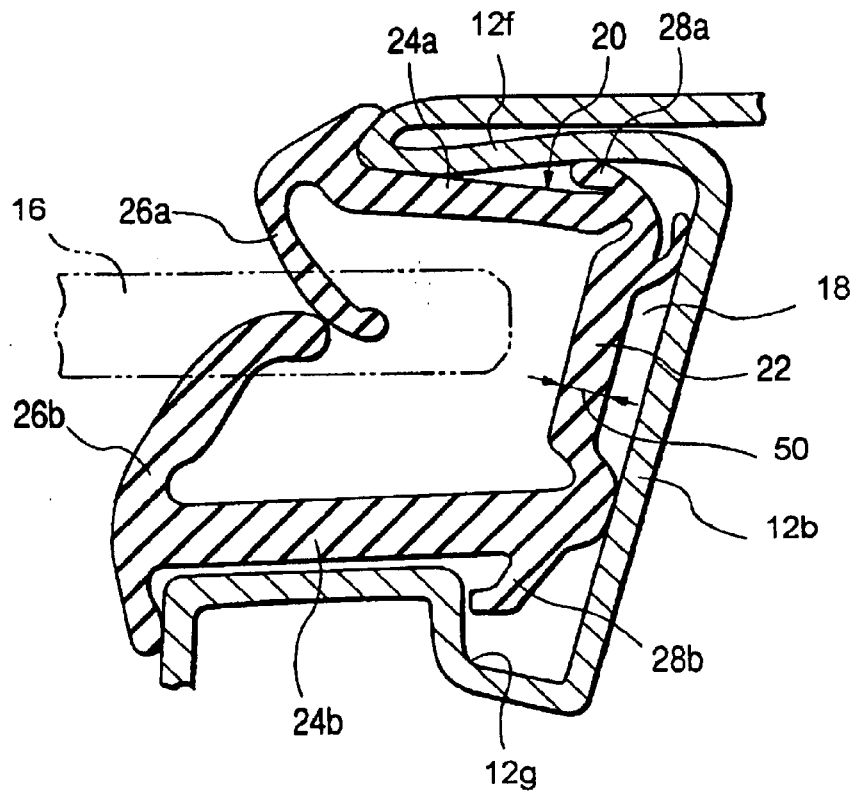
FIG. 3 is a cross sectional view taken on line III—III in FIG. 1.

The preferred embodiment of the present invention will be described with reference to the accompanying drawings, for a better understanding of the construction and operation of the invention.

FIG. 1 is an external appearance view showing a side door of a vehicle to which a vehicle glass run 10 constructed according to the invention is assembled. FIG. 2 is an external appearance view showing the vehicle glass run 10. The vehicle glass run 10 is provided with vertical-side extrusion parts 20, a horizontal-side extrusion part 30, and corner molding parts 40. The vertical-side extrusion parts 20 are mounted on front and rear vertical-side frames 12a and 12b (frame body) of a frame 12, and extrusion molded. The horizontal-side extrusion part 30 is mounted on an upper frame 12c (frame main body). L-shaped corner molding parts 40 are mounted on frame corners 12d, which are located between the vertical-side frames 12a and 12b and the upper frame 12c. The vertical-side extrusion parts 20 are extended and its lower portions are located within a side door 14. Those lower portions are mounted on retainers 12c extending downward, respectively. Corner molding parts 40 are formed by connecting the ends of the horizontal-side extrusion part 30 and the vertical-side extrusion parts 20 by molding process. A door glass 16 is supported by the vehicle glass run 10, and vertically movable while keeping a sealing. Specifically, the front and rear ends of the door glass 16 are supported by the vertical-side extrusion parts 20, while the upper end of the door glass 16 is supported so as to move into the horizontal-side extrusion part 30.

FIG. 3 is a cross sectional view taken on line III—III in FIG. 1. The front and rear vertical-side extrusion parts 20 are designed to have the same cross section in configuration as viewed in the longitudinal direction. The constructions of them are also the same at the front and rear of the side door 14. Accordingly, the rear vertical-side extrusion part 20 will typically be described. In FIG. 3, the vertical-side extrusion part 20 is formed with a vertical-side bottom 22, vertical-side side walls 24a and 24b extending frontward from both ends of the vertical-side bottom 22, and vertical-side sealing lips 26a and 26b which are extended inward (rearward) from the tips of the vertical-side side walls 24a and 24b and slidably hold the door glass 16 from both sides. The vertical-side bottom 22 and the vertical-side side walls 24a and 24b cooperate to form a U shape in cross section. Engaging lips 28a and 28b are extended outward from the ends of the vertical-side bottom 22, respectively. The engaging lip 28a engages a bending part 12f of the frame 12, and the engaging lip 28b engages an engaging concavity 12g of the frame 12. With the engagement, the vertical-side extrusion parts 20 are prevented from displacing from and slipping off the vertical-side frame 12b. The vertical-side side walls 24a and 24b are disposed on the inside and the outside of the vehicle. The outside vertical-side side wall 24a is lower than the inside vertical-side side wall 24b, thereby presenting a good appearance. The vertical-side bottom 22 is spaced from the bottom surface of the vertical-side frame 12b by a predetermined gap 18. The vertical-side bottom 22 is shaped to provide the gap 18. When the vertical-side bottom 22 is pressed to the side end of the door glass 16, it is bent toward the bottom surface of the vertical-side frame 12b, whereby the surface of the vertical-side bottom 22 is prevented from being locally worn.

Figure 4:
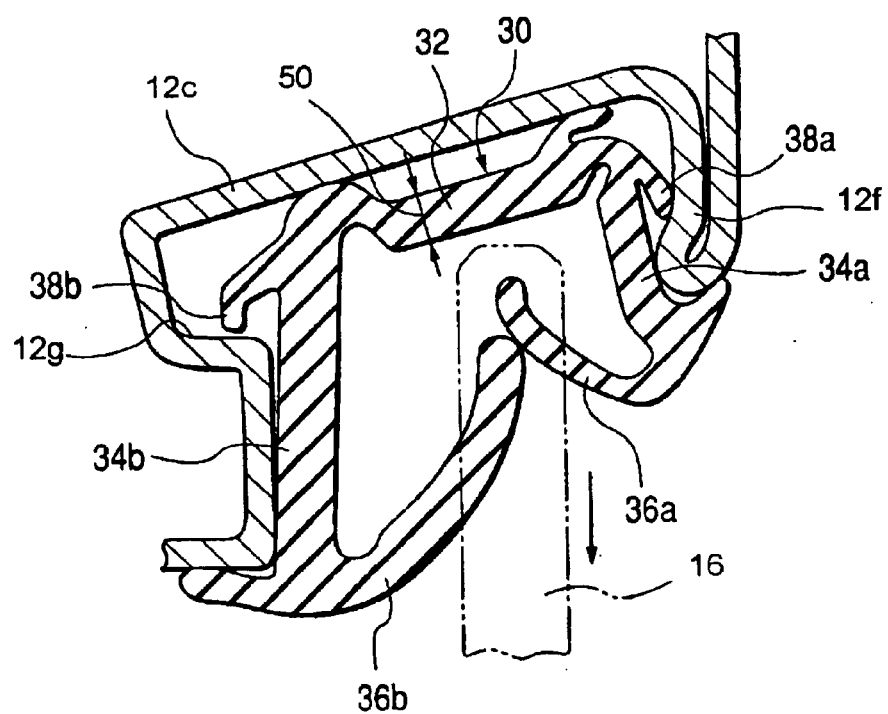
FIG. 4 is a cross sectional view taken on line IV—IV in FIG. 1.

FIG. 4 is a cross sectional view taken on line IV—IV in FIG. 1. As shown in FIG. 4, the horizontal-side extrusion part 30 is formed with a horizontal-side bottom 32, horizontal-side side walls 34a and 34b, which extend downward from both ends of the horizontal-side bottom 32 while being opposed to each other, and horizontal-side sealing lips 36a and 36b which are extended inward (upward) from the tips of the horizontal-side side walls 34a and 34b, and slidably hold the door glass 16 from both sides. The horizontal-side bottom 32, and the horizontal-side side walls 34a and 34b cooperate to from a U shape in cross section. Engaging lips 38a and 38b are extended outward from the ends of the horizontal-side bottom 32. The engaging lip 38a engages a bending part 12f of the frame 12, and the engaging lip 38b engages an engaging concavity 12g of the frame 12. With the engagement, the horizontal-side extrusion part 30 is prevented from displacing from and slipping off the upper frame 12c.

The horizontal-side side walls 34a and 34b are lower than the vertical-side side walls 24a and 24b of the vertical-side extrusion parts 20, thereby presenting a good appearance. The vertical-side side walls 24a and 24b shown in FIG. 2 are selected to be high, allowing for a tolerable error to a horizontal direction when the door glass 16 moves upwardly and downwardly, thereby preventing the door glass 16, when moved upwardly, from slipping off. The horizontal-side side walls 34a and 34b shown in FIG. 3 function to merely guide the vertical movements of the upper ends of the door glass 16. For this reason, those walls are selected to be low, thereby presenting a good appearance. Further, the horizontal-side side wall 34a located on the inside of the vehicle is selected to be lower than the horizontal-side side wall 34b on the outside of the vehicle, whereby a good appearance is presented when viewed from the outside of the vehicle.

Figure 5:
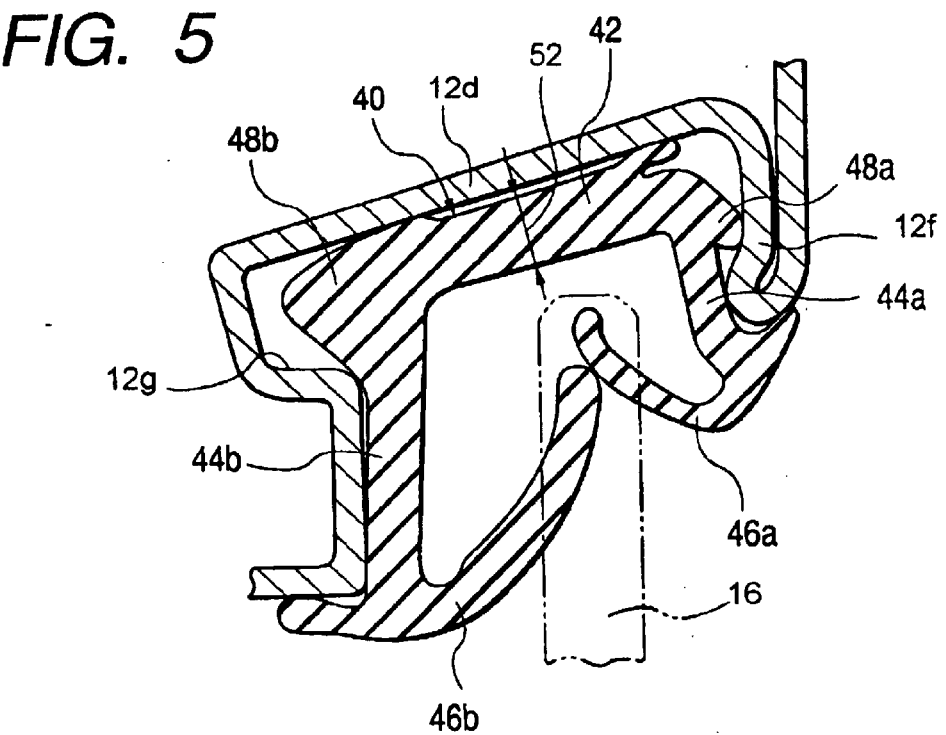
FIG. 5 is a cross sectional view taken on line V—V in FIG. 1.

As shown in FIG. 1, the corner molding parts 40 are formed in a manner that the terminal ends of the vertical-side extrusion parts 20 and the horizontal-side extrusion part 30 are connected in L shape by molding. FIG. 5 is a cross sectional view taken on line V—V in FIG. 1. The corner molding parts 40 are each formed with a mold-side bottom 42, mold-side walls 44a and 44b, mold-side sealing lips 46a and 46b, and mold-side engaging lips 48a and 48b. Those parts are integrally molded.

Figure 6:
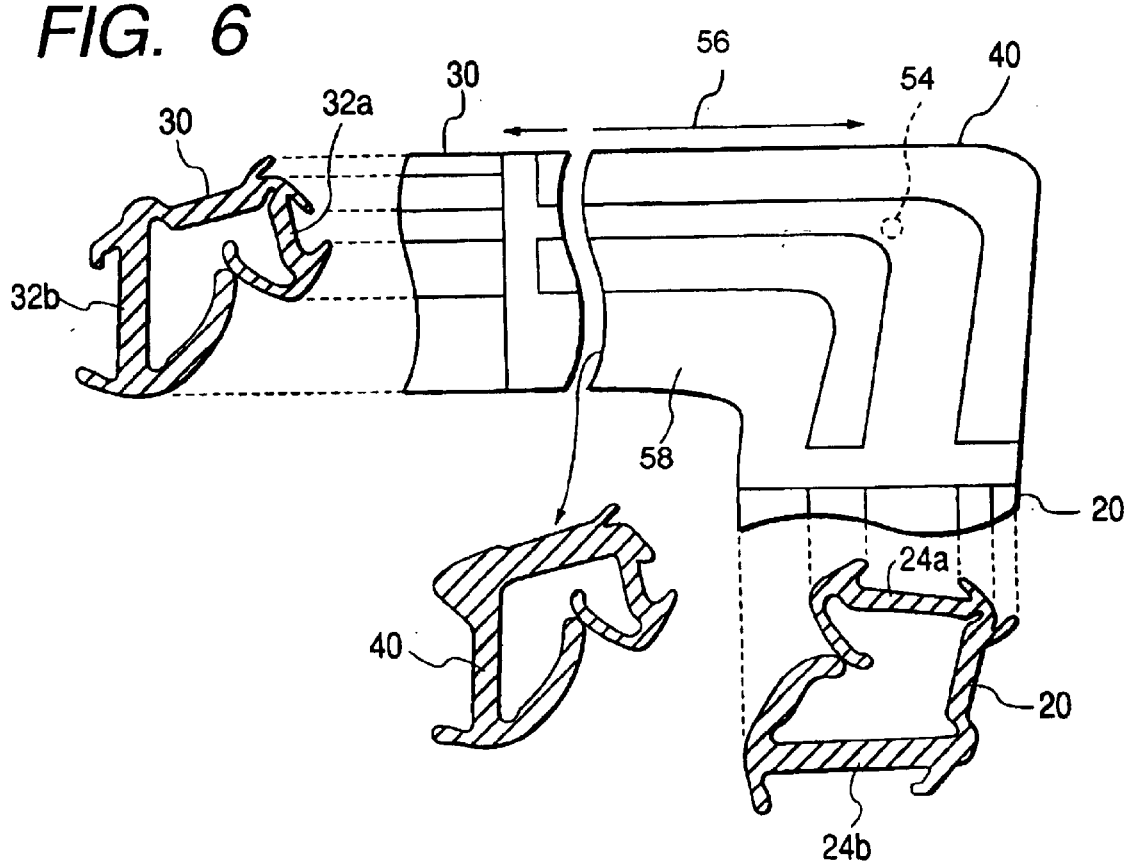
FIG. 6 is a view showing a portion in the vicinity of the corner molding part to be attached to the outside of the vehicle when viewed from its attaching side.
Figure 7:
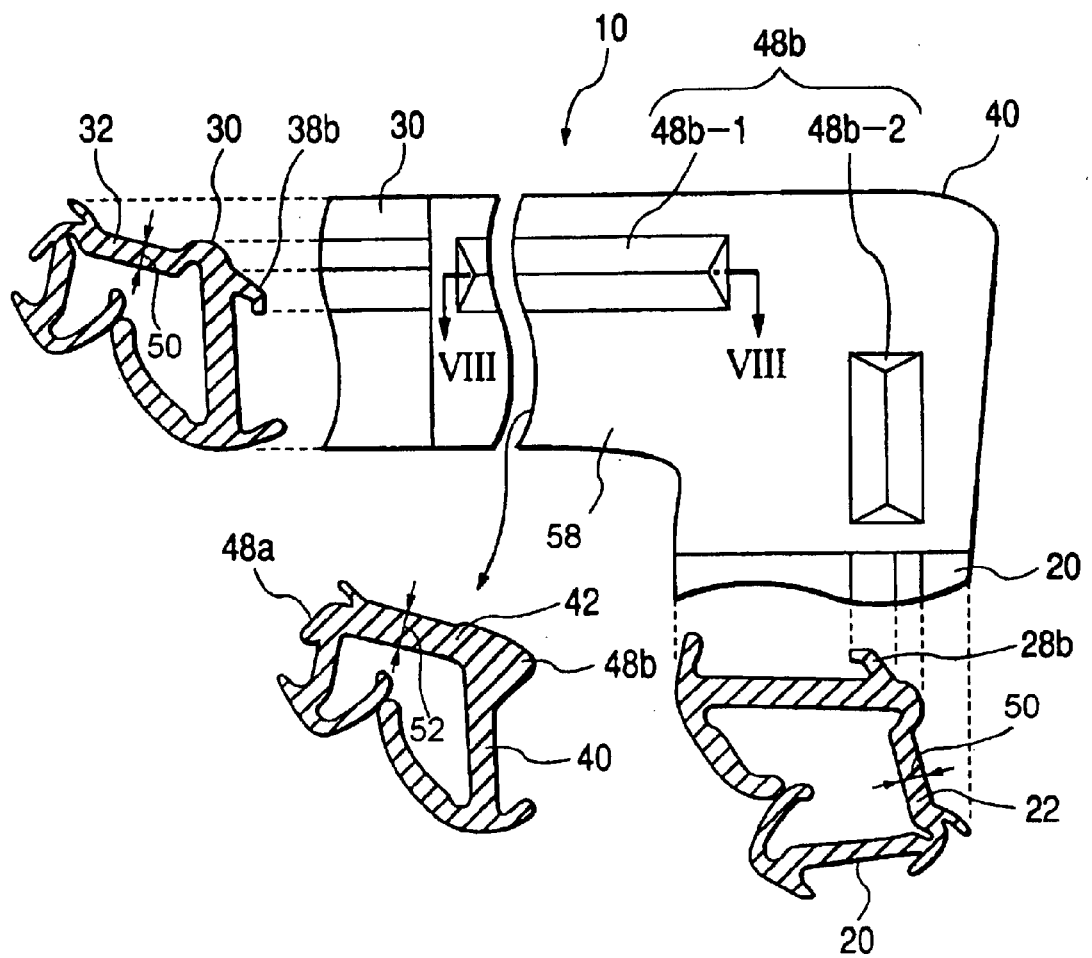
FIG. 7 is a view showing a portion in the vicinity of the corner molding part to be attached to the inside of the vehicle when viewed from its attaching side.

FIG. 6 is a view showing a portion in the vicinity of the corner molding part 40 to be attached to the outside of the vehicle when viewed from its attaching side. FIG. 7 is a view showing a portion in the vicinity of the corner molding part 40 to be attached to the inside of the vehicle when viewed from its attaching side. The corner molding part 40 includes a variable jointing part 58 whose cross section gradually decreases in area toward the horizontal-side extrusion part 30, from the vertical-side extrusion part 20. As recalled, the vertical-side side walls 24a and 24b of the vertical-side extrusion parts 20 are higher than the horizontal-side side walls 34a and 34b of the horizontal-side extrusion part 30. Accordingly, the variable jointing part 58 is gradually varied in its cross section, whereby a good appearance is presented and stress concentration is reduced.

Figure 8:
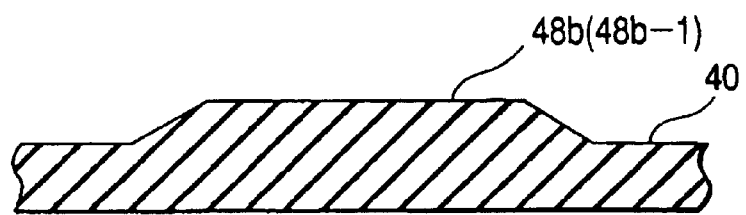
FIG. 8 is a cross sectional view taken on line VIII—VIII in FIG. 7.

As shown in FIG. 7, a thickness 52 of the mold-side bottom 42 of the corner molding part 40 is larger than a thickness 50 of the vertical-side bottom 22 of the vertical-side extrusion parts 20 and the horizontal-side bottom 32. That is, by forming the mold-side bottom 42 thick, its rigidity is increased. As a result, a force of the mold-side engaging lip 48b used when it engages the frame corner 12d is set to be high. As shown in FIG. 7 and FIG. 8 which is a cross sectional view taken on line VIII—VIII in FIG. 7, the mold-side engaging lip 48b is raised, and divided into separate protrusions 48b-1 and 48b-2 in order to facilitate the mounting work. The height of them is higher than the engaging lip 28b of the vertical-side extrusion parts 20 and the engaging lip 38b of the horizontal-side extrusion part 30. The mold-side engaging lip 48a is higher than the engaging lip 28a and the engaging lip 38a, thereby increasing the engaging force. Accordingly, a force by which the corner molding parts 40 is supported on the frame corner 12d is larger than a force by which the vertical-side extrusion parts 20 and the horizontal-side extrusion part 30 are supported on the vertical frame 12b and the upper frame 12c.

The vehicle glass run 10 of the embodiment is mounted in such a way that the vertical-side extrusion parts 20, the horizontal-side extrusion part 30 and the corner molding parts 40 are pressed into the vertical frames 12a and 12b, the upper frame 12c, and the frame corners 12d, which form the frame 12. In this case, the engaging lip 28b of the vertical-side extrusion part 20, the engaging lip 38b of the horizontal-side extrusion part 30, and the mold-side engaging lip 48b of the corner molding part 40 are brought into engagement with the engaging concavity 12g, and resiliently held there.

In the mounting state, a widthwise rigidity of the mold-side bottom 42 of the corner molding part 40 is larger than that of the vertical-side bottom 22 of the vertical-side extrusion parts 20 or the like. Its force to engage with the frame corner 12d is large. The frame corner 12d whose dimensional tolerance is easy to vary when comparing with the vertical frame 12b or the like, is not compressed in width, and maintains its desired configuration. Accordingly, the corner molding parts 40 is not displaced if the door glass 16 slidably moves.

Further, the mold-side bottom 42 of the corner molding part 40 has a large widthwise rigidity. Because of this, when it is press fit to the vertical frame 12b, it maintains its configuration and its firmly positioning is secured.

In the embodiment, the rigidity of the mold-side bottom 42 is increased by merely increasing its thickness. This feature accrues to an advantage that the vehicle glass run may be manufactured through slightly modifying of a shape of the mold for injection molding.

Additionally, the mold-side engaging lip 48b is formed on the mold-side wall 44b, which is larger than the mold-side wall 44a. Therefore, its engaging force when it engages the frame corner 12d is increased.

Materials forming the vehicle glass run 10 will be described. The horizontal-side extrusion part 30 and the vertical-side extrusion parts 20 of the vehicle glass run 10 are made of the same kind of material (first material). The first material is an olefin thermoplastic elastomer, and contains 70 weight parts of EPDM and 30 weight parts of PP as main materials. The corner molding parts 40 is made of a second material whose viscosity is lower than that of the first material. The second material is prepared by adding a third material of low viscosity to the first material. The third material may be PP, which is lower in molecular weight than that of the PP contained in the first material. The second material is prepared such that 1 to 10 weight parts of the third material is added to the first material, and a melting point of the resultant is 150 to 160° C.

A melt flow rate of the second material is lower than that of the first material. The melt flow rates were defined by using a testing method of thermoplastics flow according to JIS K7210 (1133). In the testing method, a molten thermoplastic material is forced through a die having a predetermined length and a predetermined diameter under a predetermined temperature and a predetermined load, and an extruding rate of the material is measured. The test conditions were: a temperature of the molten material was 230° C. and the load was 10 Kg. In the test definition, the MFR of the first material was 45 to 70 g/10 min and the MFR of the second material was 70 to 100 g/10 min.

A process of manufacturing the vehicle glass run 10 will be described. The general manufacturing process is used for the vehicle glass run 10 manufacturing. The first material is extruded to form extruded pieces for the vertical-side extrusion parts 20 and the horizontal-side extrusion part 30. Subsequently, a molding process is carried out. A mold (not shown) has a cavity for forming the corner molding parts 40. A gate of the mold is positioned at a location which is filled with the second material at the weight ratios that are substantially equal to each other when the second material flows toward the terminals of the horizontal-side extrusion part 30 and the vertical-side extrusion part 20. For the corner molding part 40 shown in FIG. 6, it may be a position corresponding to an injection position 54.

Subsequently, in a state that the mold is kept warm at 60 to 80° C., the vertical-side extrusion parts 20 and the horizontal-side extrusion part 30 are set in the mold. The second material is injected into the cavity via the gate. The second material that has been injected into the cavity reaches the terminal ends of the horizontal-side extrusion part 30 and the vertical-side extrusion parts 20. The terminal ends of them are molten by heat and pressure, and cooled and solidified, whereby the corner molding parts 40 are heat welded to the horizontal-side extrusion part 30 and the vertical-side extrusion parts 20. As a result, the vehicle glass run 10 shown in FIG. 2 is formed without any post-treatment.

Further, the second material is low in viscosity and large in fluidity, so that even if a distance 56 from the injection position 54 to the horizontal-side extrusion part 30 and the vertical-side extrusion part 20 is long, the material keeps its high temperature and reaches the terminal ends in a molten state the terminal ends, and melts the terminal ends of them and heat welds to those terminal ends. Therefore, even when the cross section of the horizontal-side extrusion part 30 is different in configuration from that of the vertical-side extrusion part 20, the cross sections of the corner molding parts 40 are also different in configuration, and the length of the corner molding parts 40 is large, the corner molding parts 40 are reliably welded to both the terminal ends of them. As a result, the connecting strength is increased.

Further, the second material is low in viscosity and large in fluidity, so that even if a distance L1 from the injection position Gt to the horizontal-side extrusion part 30 and the vertical-side extrusion part 20 is long, the material keeps its high temperature and reaches the terminal ends in a molten state the terminal ends, and melts the terminal ends of them and heat welds to those terminal ends. Therefore, even when the cross section of the horizontal-side extrusion part 30 is different in configuration from that of the vertical-side extrusion part 20, the cross sections of the corner molding parts 40 are also different in configuration, and the length of the corner molding parts 40 is large, the corner molding parts 40 are reliably welded to both the terminal ends of them. As a result, the connecting strength is increased.

If the second material of low viscosity is used for the corner molding parts 40, a hardness of it is slightly increased. However, it little affects the use performance of the vehicle glass run 10. Since the first material as the normal thermoplastic elastomer is used for the vertical-side extrusion parts 20 and the horizontal-side extrusion part 30, there is no chance that the use performance of the vehicle glass run 10 is degraded.

It should be understood that the present invention is not limited to the above-mentioned embodiment, but may variously be modified, altered and changed within the true spirits and scope of the invention. Some modifications will be given below.

In the embodiment mentioned above, the invention is applied to the glass run assembled into the side door 14 of a vehicle. It is evident that the invention may be applied to the glass lifting windows of other vehicles than the vehicle, such as trains and ships.

The viscosity of the second material may be decreased in various ways. An example of it is to change the molecular weight of it, and another example is to use another material, e.g., polyethylene (PE), in place of the PP of a resin component.

What is claimed is:

1. A glass run that is mountable on a frame, which has a substantially straight frame body and an L-shaped frame corner part connected to the frame body, so that said glass run slidably supports a door glass, said glass run comprising:

a horizontal extrusion part and vertical extrusion parts, which are mountable on the frame body; and corner molding parts having variable cross sections connecting terminal ends of said horizontal extrusion part and said vertical extrusion parts by injection molding and being mountable on the frame corner parts, wherein:

the cross sectional shape of the horizontal extrusion part, the cross sectional shape of the vertical extrusion parts, and the cross sectional shape of the corner molding parts are generally U-shaped but are different from one another, and each of the horizontal extrusion part, the vertical extrusion parts and the corner molding parts includes a pair of opposed sidewalls and a bottom, which form the U-shaped cross sectional shape and receive the door glass;

horizontal parts of the corner molding parts are larger than vertical parts of the corner molding parts; and a thickness of the bottom of said corner molding parts is larger than that of said horizontal extrusion part and said vertical extrusion parts the horizontal extrusion part and the vertical extrusion parts are made of a first material of an olefin thermoplastic elastomer, and the corner molding parts are made of a second material, which is an olefin thermoplastic elastomer and has a viscosity lower than that of the first material when the first and second materials are in liquid form;

the second material comprises a main material that is the same as the first material and a third material, the viscosity of which is lower than that of the first material.

2. A glass run according to claim 1, wherein each of said horizontal extrusion part, said vertical extrusion parts and said corner molding parts has an engaging lip for engaging said frame, and a height of the engaging lip of said corner molding parts is larger than that of said horizontal extrusion part and said vertical extrusion parts.

3. A glass run according to claim 2, wherein the engaging lip of said corner molding parts comprises at least two protrusions.

4. A glass run that is mountable on a frame, which has a substantially straight frame body and an L-shaped frame corner part connected to the frame body, so that the glass run slidably supports a door glass, and the glass run comprises:

a horizontal extrusion part and vertical extrusion parts, which are mountable on the frame body wherein a part of the horizontal extrusion part by which the door glass is supported is narrower than corresponding parts of the vertical extrusion parts; and corner molding parts, which connect terminal ends of the horizontal extrusion part and the vertical extrusion parts by injection molding, wherein the corner molding parts are mountable on the frame corner parts, and wherein:

the cross sections of the horizontal extrusion part, vertical extrusion parts, and corner molding parts are different;

the corner molding parts include variable connecting parts the cross sections of which gradually decrease in area toward the horizontal extrusion part from the vertical extrusion parts;

horizontal parts of the corner molding parts are larger than vertical parts of the corner molding parts;

the horizontal extrusion part and the vertical extrusion parts are made of a first material of an olefin thermoplastic elastomer, and the corner molding parts are made of a second material, which is an olefin thermoplastic elastomer and has a viscosity lower than that of the first material when the first and second materials are in liquid form;

a melt flow rate of the materials are measured by a Japanese Industrial Standard (JIS) K7210 testing method, which corresponds to ISO 1133, and a melt flow rate of the first material is 45 to 70 g/10 min. and a melt flow rate of the second material 70 to 100 g/10 min.;

each of the horizontal extrusion part, the vertical extrusion parts and the corner molding parts has a bottom, and a thickness of the bottoms of the corner molding parts is greater than that of the horizontal extrusion part and the vertical extrusion parts; and each of the horizontal extrusion part, the vertical extrusion parts and the corner molding parts has an engaging lip for engaging the frame, and a height of the engaging lip of the corner molding parts is greater than that of the horizontal extrusion part and the vertical extrusion parts.

5. A glass run that is mountable on a frame, which has a substantially straight frame body and an L-shaped frame corner part connected to the frame body, so that the glass run slidably supports a door glass, and the glass run comprises:

a horizontal extrusion part and vertical extrusion parts, which are mountable on the frame body, wherein a part of the horizontal extrusion part by which the door glass is supported is narrower than corresponding parts of the vertical extrusion parts; and corner molding parts, which connect terminal ends of the horizontal extrusion part and the vertical extrusion parts by injection molding, wherein the corner molding parts are mountable on the frame corner parts, and wherein:

the cross sections of the horizontal extrusion part, vertical extrusion parts, and corner molding parts are different;

the corner molding parts include variable connecting parts, the cross sections of which gradually decrease in area toward the horizontal extrusion part from the vertical extrusion parts;

horizontal parts of the corner molding parts are larger than vertical parts of the corner molding parts;

the horizontal extrusion part and the vertical extrusion parts are made of a first material of an olefin thermoplastic elastomer, and the corner molding parts are made of a second material, which is an olefin thermoplastic elastomer and has a viscosity lower than that of the first material when the first and second materials are in liquid farm;

a melt flow rate of the materials are measured by a Japanese Industrial Standard (JIS) K7210 testing method, which corresponds to ISO 1133, and a melt flow rate of the first material is 45 to 70 g/10 min. and a melt flow rate of the second material 70 to 100 g/10 min.;

the second material comprises a main material that is the same as the first material and a third material, the viscosity of which is lower than that of the first material; and the first material mainly contains 70 weight parts of ethylene-polypropylene rubber and 30 weight parts of polypropylene, the third material is polypropylene, the viscosity of which is lower than that of the polypropylene contained in the first material, and the second material comprises 1 to 10 weight parts of the third material.

6. A glass run according to claim 5, wherein each of said horizontal extrusion part, said vertical extrusion parts and said corner molding parts has a bottom, and a thickness of the bottom of said corner molding parts is larger than that of said horizontal extrusion part and said vertical extrusion parts.

7. A glass run according to claim 5, wherein each of said horizontal extrusion part, said vertical extrusion parts and said corner molding parts has an engaging lip for engaging said frame, and a height of the engaging lip of said corner molding parts is larger than that of said horizontal extrusion part and said vertical extrusion parts.

8. A glass run according to claim 7, wherein the engaging lip of said corner molding parts comprises at least two protrusions.

* * * * *